Aug. 11, 1942.   B. PRATT   2,292,845
PIPE COUPLING
Filed July 25, 1941   2 Sheets-Sheet 2

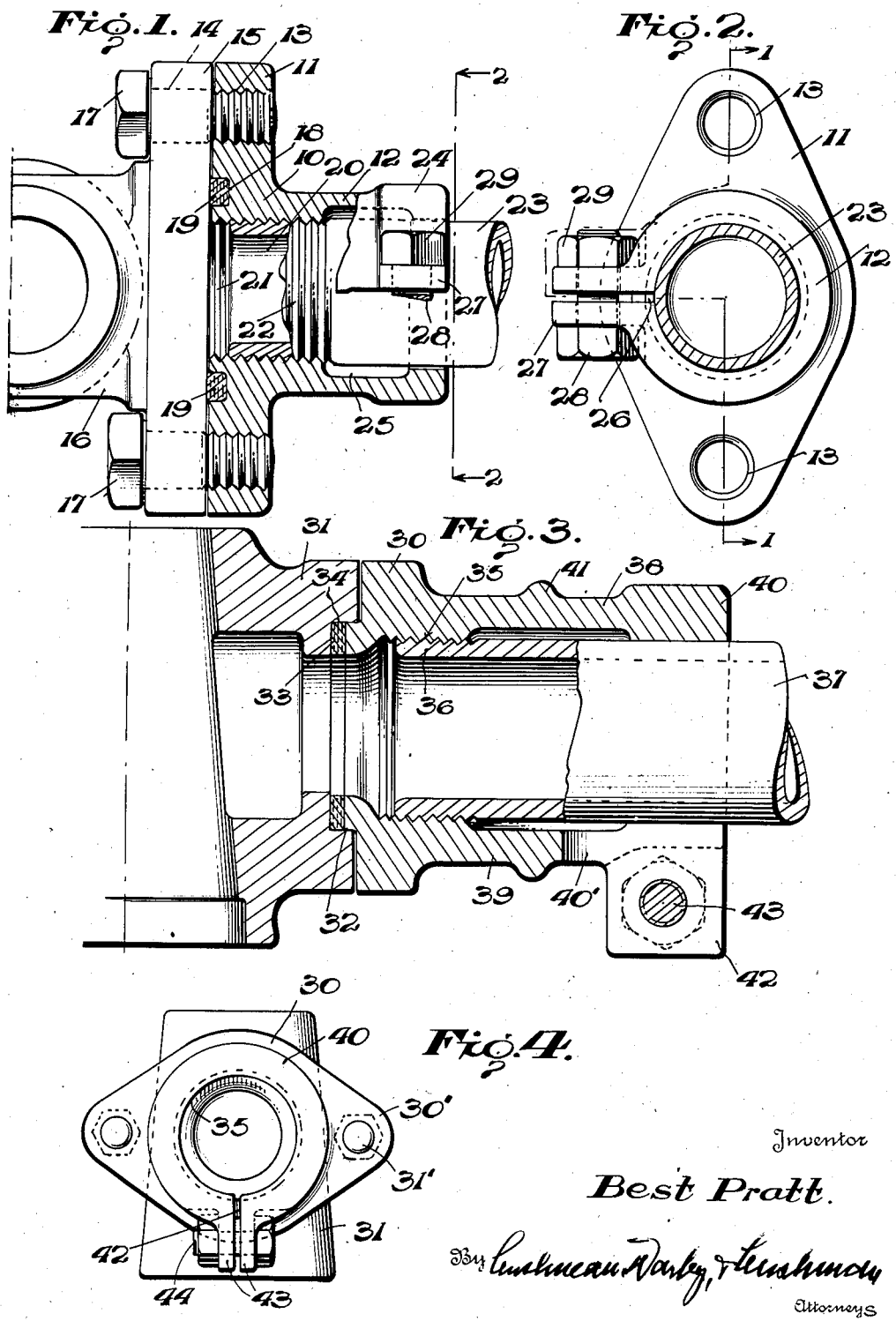

Inventor
Best Pratt.

Patented Aug. 11, 1942

2,292,845

UNITED STATES PATENT OFFICE 2,292,845

PIPE COUPLING

Best Pratt, Chicago, Ill., assignor to Brake Equipment & Supply Company, Chicago, Ill., a corporation of Illinois Application July 25, 1941, Serial No. 404,090

2 Claims. (Cl. 285—147)

This invention relates to coupling attachments for pipes and more particularly to simple, efficient, and economical means for connecting pipe sections, fittings, valves, threaded members and the like to each other or to a suitable support.

Essential features of the invention are to provide a coupling assembly which may be readily manufactured preferably in an integral structure; which can be quickly coupled to its associated parts, and in which the coupling or uncoupling may be effected at a minimum expenditure of time and handling of the parts by the workmen. When the coupling is associated with an angle cock and an air brake pipe line of a train, means are provided to allow the removal of the cock body for repairs without disturbing the coupling pipe assembly. The coupling assembly also constitutes compressible means for supporting the pipe at a point remote from the threaded end connection of the pipe with the coupling in order to relieve the threaded end portion of the pipe from the shocks, strains and vibrations it would otherwise receive and to protect the pipe and the threads from being broken or damaged when in service.

For the purpose of illustrating a practical embodiment of the invention, the same is shown associated with air brake equipment for trains. However, it will be manifest that the improved coupling attachment may be used with various other types of coupling installations to insure a tight, strong and durable connection of the assembled parts.

Figure 5:
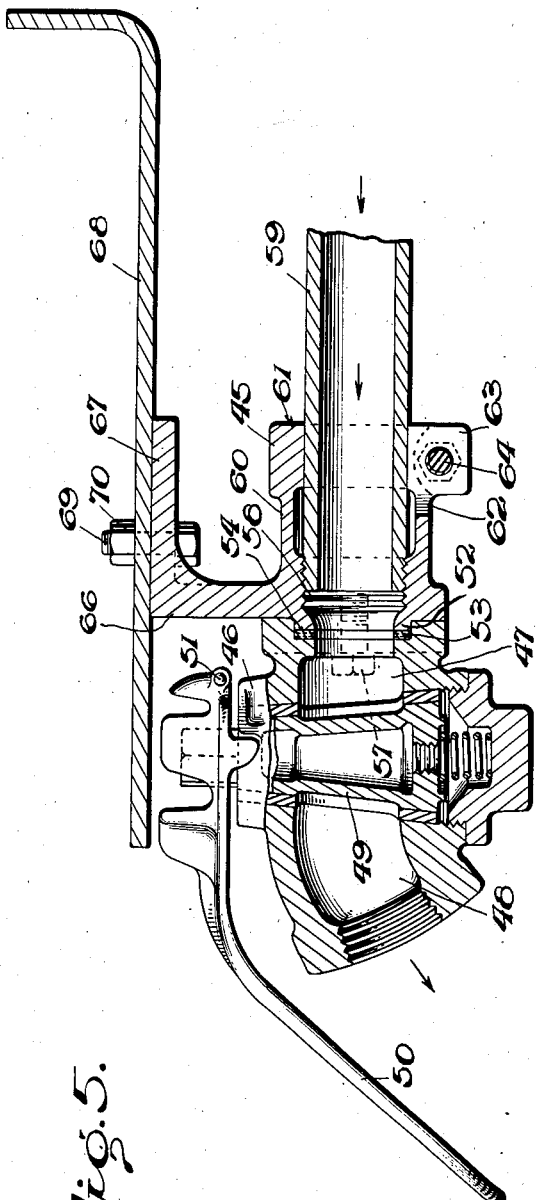
Figure 6:
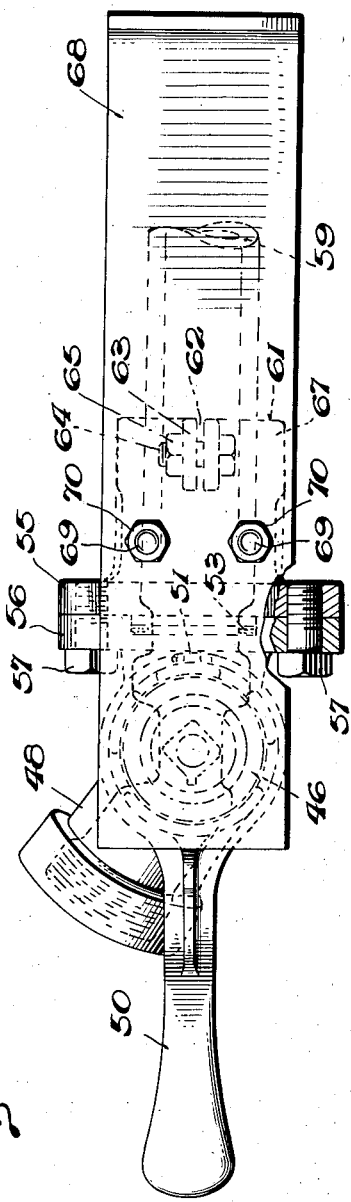

Referring to the drawings, in which are shown several preferred embodiments of the invention, Figure 1 is a plan view of the coupling attachment shown associated with an angle cock and with parts in section for the purpose of clearness of illustration, Figure 2 is a sectional view taken substantially along the line 2—2 of Figure 1, Figure 3 is a longitudinal sectional view of a modified form of the invention, Figure 4 is a right-hand end view of Figure 3, Figure 5 is a longitudinal sectional view of another modified form of the invention, and Figure 6 is a plan view of Figure 5.

Referring to the drawings, in which like numerals indicate like parts in the several views, 10 designates a pipe union or coupling member which includes a flange portion 11 and a sleeve or tubular nipple portion 12. The flange portion 11 may be shaped as shown in Figure 2 and has spaced opposite threaded openings 13 arranged to align with complimentary openings 14 in the flange 15 of the valve body 16 so as to be detachably secured thereto by the bolts or cap screws 17. The outer surface of the flange 11 is preferably provided with an annular groove 18 in which is mounted a packing 19 which bears against the adjacent face of the flange 15 so as to insure a tight seal when the parts are assembled.

The union 10 is provided with a bore 20 having an internally threaded wall 21 which extends from the outer end of the flange portion 11 a limited distance inwardly and into the nipple portion 12 so as to receive the threaded end 22 of the pipe section 23. The nipple portion 12 is formed with a relatively thickened or enlarged outer end section 24 and a relatively thin section 25 between the flange 11 and the end section 24. The section 24 is of substantially the same diameter as the threaded end 21 while the section 25 is of larger diameter. The enlarged or thickened end section 24 has a longitudinal slit 26 (Figure 2) and is provided with spaced lugs 27 extending outwardly from opposite sides of the slit 26. The lugs 27 have aligned openings through which extend a threaded bolt 28 that receives a nut 29 for firmly clamping and supporting the pipe 23 at a point outwardly spaced from the threaded end connection of the pipe with the coupling. The body portion 12 of the nipple adjacent the end section 24 is thinner in cross section for at least a portion of its length in order to give greater compressibility and to permit the outer slitted end portion 24 being firmly clamped against the smooth portion of the pipe by the bolt 28, and at a point spaced from the threaded connection 22 of the pipe with the coupling. In other words, the coupling constitutes a compressible supporting means for the pipe adjacent the outer end of the nipple 12. The parts are so arranged and constructed that the smooth portion of the bore directly contacts with the adjacent smooth portion of the pipe while the thin or reduced portion of the coupling is spaced from the pipe to insure the threaded end portion 22 of the pipe being maintained in a fixed position and free from the strains and vibrations to which a device of this character is ordinarily subjected. The detachable connection of the valve body 16 with the coupling 10 by the bolts 17, allows the valve body to be quickly and easily removed or connected to the coupling without disturbing the connection of the pipe 23 with the coupling. Moreover, means for clamping the coupling to the pipe is positioned so as to be conveniently applied and requires the use of simple, inexpensive and standard parts, thus eliminating the necessity of using separate means, such as a ring or wedge member to effect the clamping engagement of the union with the pipe.

In the form of the invention disclosed in Figures 3 and 4, the union or coupling member 30 is provided with oppositely disposed flange portions 30' which register with corresponding flanges on the valve body 31 and are detachably secured thereto by the threaded bolts 31'. The union 30 has a protruding annular boss 32 arranged to extend into a complimentary recess 33 in the adjacent side of the valve body 31 and engage a packing or gasket 34 so as to insure proper alignment of the parts when the coupling is initially attached to the valve body. The smooth bore of the coupling 30 is internally threaded as at 35 to receive the adjacent threaded end portion 36 of the pipe 37, and the nipple portion 38 is provided with a relatively thin section 39 and a relatively thickened or enlarged outer end section 40. The thin section 39 may be formed with an annular bead 41 so that when the coupling assembly is associated with an angle cock of an air brake pipe system in which fastening means such as a U-shaped bolt is used for supporting the angle cock and train pipe, the bead 41 will engage the fastening means to prevent axial sliding of the coupling and the pipe relative thereto. The thickened end portion 40 of the nipple has a longitudinal slot 42 similar in construction to the slot 26 previously described and is also formed with outwardly extending lugs 43 through which extends the bolt 44 for clamping the outer end portion of the nipple to the pipe 37 at a point spaced or remote from the threaded end connection 35. Due to the compressibility of the thin section 38, it will be seen that when the outer end 40 of the nipple is clamped to the pipe, means are provided for insuring a tight and firm engagement of the nipple with the pipe so as to lessen the strain the inner threaded section 36 of the pipe would otherwise be subjected to if the compressible supporting means were not provided. The protruding boss 32 insures the opening in the end of the pipe being maintained in proper alignment with the valve opening when the parts are being tightened up. The combined pipe flange and clamp is made to correspond to the measurements of a standard angle cock or valve body so that the latter may be removed for the purpose of repair or inspection without disturbing the coupling assembly and at a minimum expenditure of time and effort.

In the modification disclosed in Figures 5 and 6, the combined coupling and clamping member 45 is shown associated with an angle cock or valve body 46 arranged to be connected to the train for conveying and controlling the compressed air to the brake system. The valve body 46 has a horizontal inlet conduit or nipple 47 and an angularly disposed outlet conduit or elbow 48 through which the fluid passes in the direction of the arrow as shown in Figure 5. A vertically disposed tapered valve 49 positioned within the valve body 46 has its upper end operatively connected to a handle 50 for controlling flow of the fluid through the valve. The handle 50 is hinged as at 51 to the valve body and is curved or bent downwardly so as to be operated in a substantially horizontal plane. As shown, the valve 46 and its associated parts are substantially similar in construction and operation to the valve embodied in my Patent No. 1,735,790, dated November 12, 1929.

The coupling 45 at its inner end has a protruding annular portion or boss 52 which extends into a complimentarily formed recess 53 in the nipple portion 47 of the valve body so as to engage a packing 54 in order to provide a tight joint and to insure proper alignment of the clamp with the valve body when the parts are being assembled. The coupling 45 is also provided with oppositely disposed flanges 55 (Figure 6) which align with complimentary flanges 56 on the valve body and are detachably secured thereto by the threaded bolts 57 so as to permit the convenient connection or removal of the valve body from the coupling. The smooth bore of the coupling 45 is threaded as at 58 to receive the adjacent threaded end portion of the pipe 59, and is also formed with a relatively thin intermediate section 60 and a relatively thickened or enlarged outer section 61. The thickened end portion 61 has a longitudinal slot 62 and is also provided with outwardly extending lugs 63 through which extend the threaded bolt 64 that receives the nut 65 for securely clamping the coupling member to the pipe 59 at a point remote from the threaded connection 58 of the pipe with the coupling. Extending outwardly and radially from the coupling 45 and between the flanges 55 is an integral arm or bracket member 66 having a horizontal flange portion 67 arranged to be detachably connected to a supporting member 68 by the threaded bolt 69 and the nut 70. The supporting member 68 is positioned above the coupling and overlaps the valve body so as to constitute protecting means for preventing workmen from standing on the valve body. The supporting member 68 may be connected to the end sill of a railroad car to which the angle cock is to be attached, and provides simple and efficient means for insuring the valve body and its associated parts being rigidly connected to the car and also readily removable therefrom at a minimum expenditure of time and effort.

In my aforesaid patent, the bracket supporting member is formed integral with the inlet supply nipple, so that when it is desired to remove the valve body from the car for the purpose of inspection or repair, it is also necessary to disconnect the supporting bracket and train pipe. In the present invention, on the other hand, when it is desired to remove the valve body 46, this may be readily and conveniently done by withdrawing the bolts 57 without disturbing the clamping connection of the one-piece coupling 45 with the pipe 59 or the connection of the arm 66 with the support 68. Likewise, when the coupling is attached to a car, the valve body 46 may be easily applied, upon the connection of the flanges 55 and 56 through the bolts 57.

It will be seen that in all of the forms of the invention shown, the coupling member constitutes a combined pipe flange and clamp assembly having a nipple or sleeve portion slit for compressibility and arranged to be clamped to the pipe to support the same at a point spaced or distant from the inner threaded end of the pipe, for the purpose of providing a compressible supporting means for the pipe which is so positioned as to relieve the threaded end of the pipe from the strains and vibrations it would otherwise receive, and which also lessens the liability of the threaded end portion of the pipe being broken or becoming loose when in service. Moreover, the coupling attachment is constructed and arranged to allow a repairman to remove the valve or member to which the coupling is connected for the purpose of repairs or inspection without disturbing or dismantling the pipe coupling assembly.

It is to be understood that the forms of the invention shown and described are merely illustrative of preferred embodiments and that such changes may be made as come within the purview of one skilled in the art without departing from the spirit of the invention and the scope of the appended claims.

I claim:

1. A coupling attachment for threaded members including a union having a bore provided with a threaded inner end, a portion of larger diameter adjacent thereto and having the remaining portion thereof smooth and of substantially the same diameter as the threaded portion, said union having its outer end split for compressibility, a member having a threaded end and a smooth portion extending into said union, the threaded end of the member being connected to the threaded portion of the bore and the portion of larger diameter being spaced from said member, and means for clamping the slit end of the union to the smooth portion of the member so that the threaded end of said member is relieved from shock and strain incident to use.

2. A pipe coupling including a valve body having an inlet passage provided with an annular shoulder forming a recess, a packing in said recess, a tubular member having a protruding boss extending into said recess and engaging said packing to insure proper alignment when the parts are being assembled, means for detachably connecting said member to the valve body, said member having a bore provided with a threaded inner end, a portion of larger diameter adjacent thereto and having the remaining portion thereof smooth and of substantially the same diameter as the threaded portion, said member having its outer end split for compressibility, a pipe having a threaded end connected to the threaded portion of the bore, a support above said valve body, said member adjacent its inner end having an arm extending outwardly therefrom, means connecting said arm to said support, the parts being constructed and arranged so that the valve body may be removed from or connected to the support without disturbing the connection of the pipe and said member with each other or with the support, and means for clamping the outer slit portion of said member in engagement with the smooth portion of the pipe.

BEST PRATT.